UNITED STATES PATENT OFFICE.

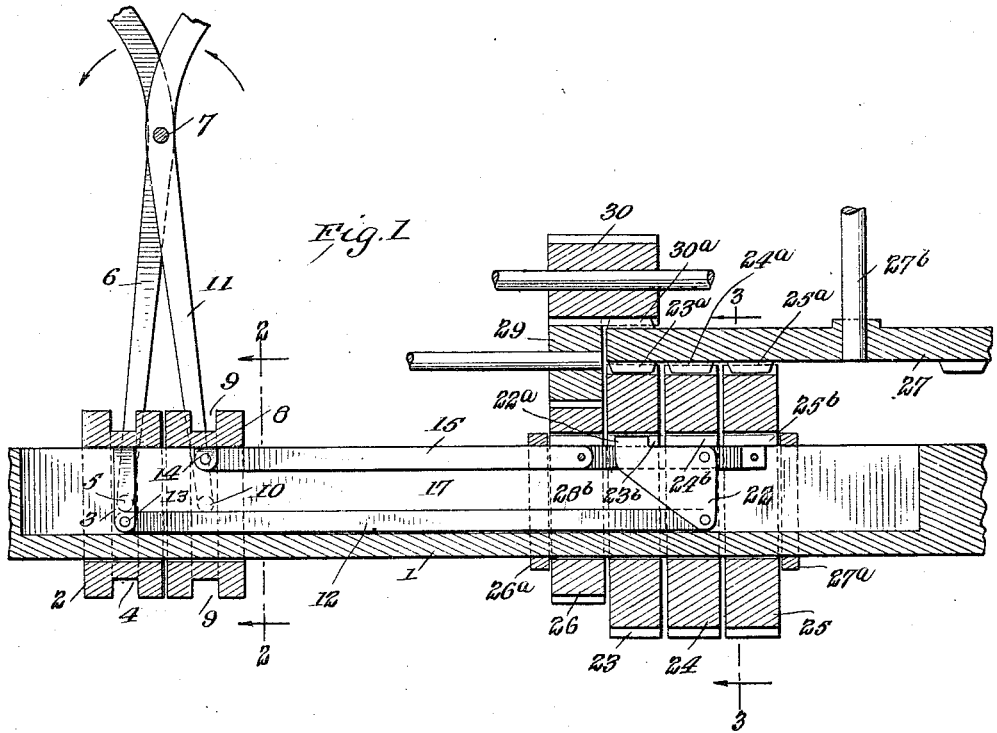
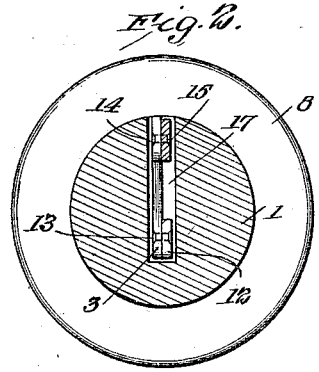
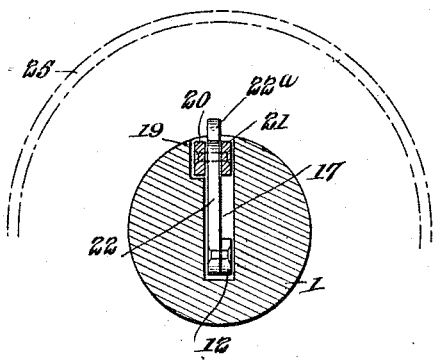

ANDREW F. STURM, OF NEHAWKA, NEBRASKA.

POWER-TRANSMISSION DEVICE.

994,616.   Specification of Letters Patent.   Patented June 6, 1911.

Application filed May 3, 1910. Serial No. 559,108.

*To all whom it may concern:*

Be it known that I, ANDREW F. STURM, a citizen of the United States, and a resident of Nehawka, in the county of Cass and State of Nebraska, have invented certain new and useful Improvements in Power-Transmission Devices, of which the following is a specification.

My invention relates to improvements in power transmission devices, and it consists, in the constructions, combinations and arrangements herein described and claimed.

An object of my invention is to provide a device in which a direct forward or a reverse movement may be attained by the use of a clutch member carried by the main shaft.

A further object of my invention is to provide a device in which the forward and reverse movement may be attained by simple mechanism, thereby eliminating the annoyances occasioned by a multiplicity of parts and reducing the cost of manufacture to a minimum.

A further object of my invention is to provide a device which may be used on automobiles, or on other devices in which forward and reverse movements are used.

A further object of my invention is to provide a device by means of which variable speed movements may be attained.

Other objects and advantages will appear in the following specification and the novel features of the device will be particularly pointed out in the appended claims.

My invention is illustrated in the accompanying drawings forming part of this application, in which—

Figure 1 is a vertical longitudinal section through the device, Fig. 2 is a section along the line 2—2 looking in the direction of the arrows, and Fig. 3 is a section along the line 3—3 looking in the direction of the arrows.

In carrying out my invention I provide a shaft 1 which is carried in suitable bearings (not shown). It will be understood that any form of bearing might be used as occasion demands. The shaft is supposed to be provided with driving mechanism (not shown). Slidably mounted on the shaft 1 is a collar 2 provided with a groove 4 arranged to receive an arm 5 secured to a lever 6 which is pivoted at 7. At 8 is a similar collar having a similar groove 9, adapted to receive the end of an arm 10 secured to a lever 11 which is also pivoted at 7.

The collar 2 is provided with an arm 3 to which the end of a rod 12 is connected, the end being secured to the arm 3 by means of a pivot pin 13. The collar 8 is provided with an arm 14 to which the end of a rod 15 is pivotally connected. The rod 12 passes through the collar 8.

At 17 I have shown a groove in the shaft 1 in which the rods 12 and 15 are disposed. The upper part of this groove is widened at 19 so as to receive the two rods 20 and 21 which are pivoted to the rod 15 and between which is pivoted a clutch member 22. The shape of this clutch member is best shown in Fig. 1. As will be seen from this figure, it is provided with an extension $22^a$. The lower end of the clutch member 22 is pivotally connected to the rod 12.

Disposed upon the shaft 17 are the gears 23, 24 and 25 and 26, the first named gear meshing with the teeth $23^a$ on a large gear 27, the second with the teeth $24^a$, and the third with the teeth $25^a$. These gears 23, 24 and 25 are held in place by collars such as those shown at $26^a$ and $27^a$, which also serve as strengthening rings for the shaft 1. The gears are slotted as shown at $23^b$, $24^b$, and $25^b$ to receive the extension $22^a$ of the clutch member 22.

The gears 23, 24 and 25 are placed at different distances from the shaft $27^b$ of the large gear 27 for the purpose of obtaining variable speeds. The shaft 1 also bears a fourth gear 26 having a slot $28^b$. This gear is meshed with an intermediate gear 29, the gear 29 being meshed on its opposite side with a gear 38. The latter gear engages teeth $30^a$ on the upper side of the gear 27.

From the foregoing description of the various parts of the device the operation thereof may be readily understood. With the device in the position shown in the drawing the gear 23 is in operation, since the clutch member 22 has been thrown so as to engage in the slot $23^b$. The rotation of the shaft 1 will, therefore, cause the rotation of the gear 23, or, if the power is applied through the gear 27, the shaft 1 will be caused to rotate through the medium of the gear 23. When it is desired to effect a change of speed or movement in the reverse direction the lever 6 is moved in the direction indicated by the arrow. It will be noted that there is a slight clearance between the collars 2 and 8, so that the collar 2 may be moved toward the collar 8. A very slight movement of the collar 2 will cause the clutch member 22 to be swung on its pivot thereby withdrawing the extension 22ª from the slot 23ᵇ. Now by simultaneously moving both of the levers 6 and 11 in the direction indicated by the arrow, the rods 12 and 15 and the clutch member 22, will be moved so that the latter may lie within the gear 24 or 25. If now the lever 6 is moved in the opposite direction to that indicated by the arrow, it will throw the clutch extension 22ª into the groove 24ᵇ (or 25ᵇ as the case may be) thereby securing the gear to the shaft 1. This will result in an increase of the speed since, as stated before, the gears 24 and 25 are nearer the center of the gear 27. In order to give a reverse movement, the clutch member 22 may be withdrawn into the shaft by moving the lever 6 as described, when a movement of the lever 11 in the opposite direction to that indicated by the arrow will move the rods 12 and 15, the clutch member 22 and both collars along the shaft in the opposite direction. When the clutch member 22 is within the gear 28, the extension may be brought into the groove 28ª. This will impart a reverse motion to the gear 27 through the medium of the gears 29 and 30.

I claim:

1. In a power transmission mechanism, a power shaft provided with a longitudinal groove, a grooved collar slidably mounted on said shaft, a plurality of gears loosely mounted on said power shaft having slots therein, a rod secured to said collar, a pair of rods pivotally secured to said first named rod, a clutch member pivotally secured between said pair of rods, an operating rod for said clutch member disposed in the groove in said power shaft, a second grooved collar slidably disposed on said shaft and secured to said clutch operating rod, and a pair of levers provided with arms arranged to enter the respective grooves in said collars.

2. In a power transmission mechanism, a power shaft provided with a longitudinal groove, a plurality of gears loosely mounted on said power shaft, a pair of slidable collars mounted on said power shaft, a clutch member pivotally mounted in the groove in said power shaft and adapted to engage said gears, a rod connecting said clutch member with one of said collars for moving the clutch member longitudinally and a second rod connected with said clutch member and to one of said collars for swinging said clutch member on its pivot.

ANDREW F. STURM.

Witnesses:
O. U. CARROLL,
J. M. PALMER.

---

Copies of this patent may be obtained for five cents each, by addressing the "Commissioner of Patents, Washington, D. C."